United States Patent
Lin

(10) Patent No.: US 7,394,504 B2
(45) Date of Patent: Jul. 1, 2008

(54) TELEVISION WITH THE FREQUENCY MODULATION RECEIVER

(75) Inventor: Yet-Zen Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 560 days.

(21) Appl. No.: 11/201,219

(22) Filed: Aug. 11, 2005

(65) Prior Publication Data

US 2006/0146203 A1     Jul. 6, 2006

(30) Foreign Application Priority Data

Dec. 30, 2004     (TW) ................................ 93141400 A

(51) Int. Cl.
*H04N 5/46* (2006.01)
*H04N 5/50* (2006.01)

(52) U.S. Cl. ........................................ 348/729; 348/731

(58) Field of Classification Search ................ 348/725, 348/729, 731–733, 738, 736; 455/23, 42, 455/205; *H04N 5/44, 5/46, 5/50, 5/60*
See application file for complete search history.

(56) References Cited

U.S. PATENT DOCUMENTS 7,327,406 B2 * 2/2008 Utsunomiya et al. ........ 348/731
2003/0172381 A1 * 9/2003 Janevski ...................... 725/46

* cited by examiner

*Primary Examiner*—Sherrie Hsia
(74) *Attorney, Agent, or Firm*—Bacon & Thomas, PLLC

(57) ABSTRACT

The present invention concerns a television with the frequency modulation receiver. The sound demodulation method of the television as well as that of a FM radio is a way of frequency modulation. Therefore, the users may utilize the identical tuner, sound demodulation circuit and audio amplifier to receive the FM broadcast programs they want to listen to. The users may also utilize the TV video circuit to display the information, such as radio frequency and volume, on the screen. In this way, the present invention can not only save components of a radio but also lower the cost and waste of hardware. Besides, because the screen of the present invention is a Liquid Crystal Display, the radio broadcast information can be displayed on the screen immediately when the users turn on the television. Therefore, the present invention can also shorten the waiting time for the users.

4 Claims, 3 Drawing Sheets

TELEVISION WITH THE FREQUENCY MODULATION RECEIVER

BACKGROUND OF THE INVENTION

1. Field of the Invention

The present invention relates to a television and more particularly, to a television with the frequency modulation receiver.

2. Description of Related Art

The progress of times and technology gives an impetus to the development of the industry and the demand of the market, and the development of the high-tech industry inject new life into the industries of television and monitor. Therefore, television has become one of the necessary household electric equipment and also the electric equipment with highest utility rate in a family.

Except for the basic functions of image display and sound broadcasting, however, the traditional television at most has the function of connecting to the external display device, such as VCD Player or DVD Player. There is no further development in television so that the television does not have diverse functions.

Nowadays, television and radio are nearly the essential equipments in a family. The traditional television with a function of receiving the frequency modulation is to put two independent products together in the same television. Furthermore, the traditional television uses the TV picture tube to display image so that the users have to wait for a period of time to see the image after turning on the television. Therefore, it is unsuitable to display the radio frequency information on the screen, which causes the inconvenience in use. In addition, another traditional technology combining television and radio is to set the screen on the status of turning-on, which allows the users to see the image immediately. However, this design may cause immense power consumption and shorten the life span of the television, which causes the confusion in use.

Therefore, it is desirable to provide a television with the frequency modulation receiver of the present invention that eliminates the aforesaid problems.

SUMMARY OF THE INVENTION

The television with the frequency modulation receiver of the present invention comprises a Liquid Crystal Display (LCD), a scaler Integrated Circuit (IC), an audio processor, an audio amplifier, a video decoder, a speaker, and a Micro Control Unit (MCU), wherein, the MCU electrically connects to the scaler IC, the video decoder and the audio amplifier through an I²C Bus respectively. To emphasize the characteristic of the present invention, the television further comprises a tuner, and a control device. The tuner applied for both television and frequency modulation (FM), the tuner comprises an antenna terminal electrically connects to an external antenna. The control device electrically connects to the aforesaid MCU and transmits protocol to the tuner through the I²C Bus. The tuner adjusts its frequency to a desired channel according to the content of the protocol, and then outputs an audio signal to the aforesaid audio processor, the audio processor includes a FM demodulator, the FM demodulator electrically connects to the audio amplifier and demodulates the audio signal and outputs to the audio amplifier for broadcasting through the speaker. Since the sound demodulation method of television and that of radio are the same, the present invention can combine the audio unit of television and FM radio into one and, therefore, lower the cost and waste of hardware.

Besides, the scaler IC can display the broadcast information on the Liquid Crystal Display and the broadcast information at least includes channel information corresponding to a specific frequency. Therefore, by means of the Liquid Crystal Display, the broadcast information can be displayed immediately without waiting for a long time when the users turn on the television, which greatly increases the convenience in using.

The frequency received and adjusted by the tuner ranges from 88 MHz to 108 MHz. The above-mentioned control device preferably is an infrared rays receiver that can receive an infrared rays controlling signals from a remote controller and correspondingly producing the controlling signals. In addition, the control device further comprises an input key set to input a specific signal to adjust the frequency of the tuner.

DETAILED DESCRIPTION OF THE PREFERRED EMBODIMENT

Figure 1:
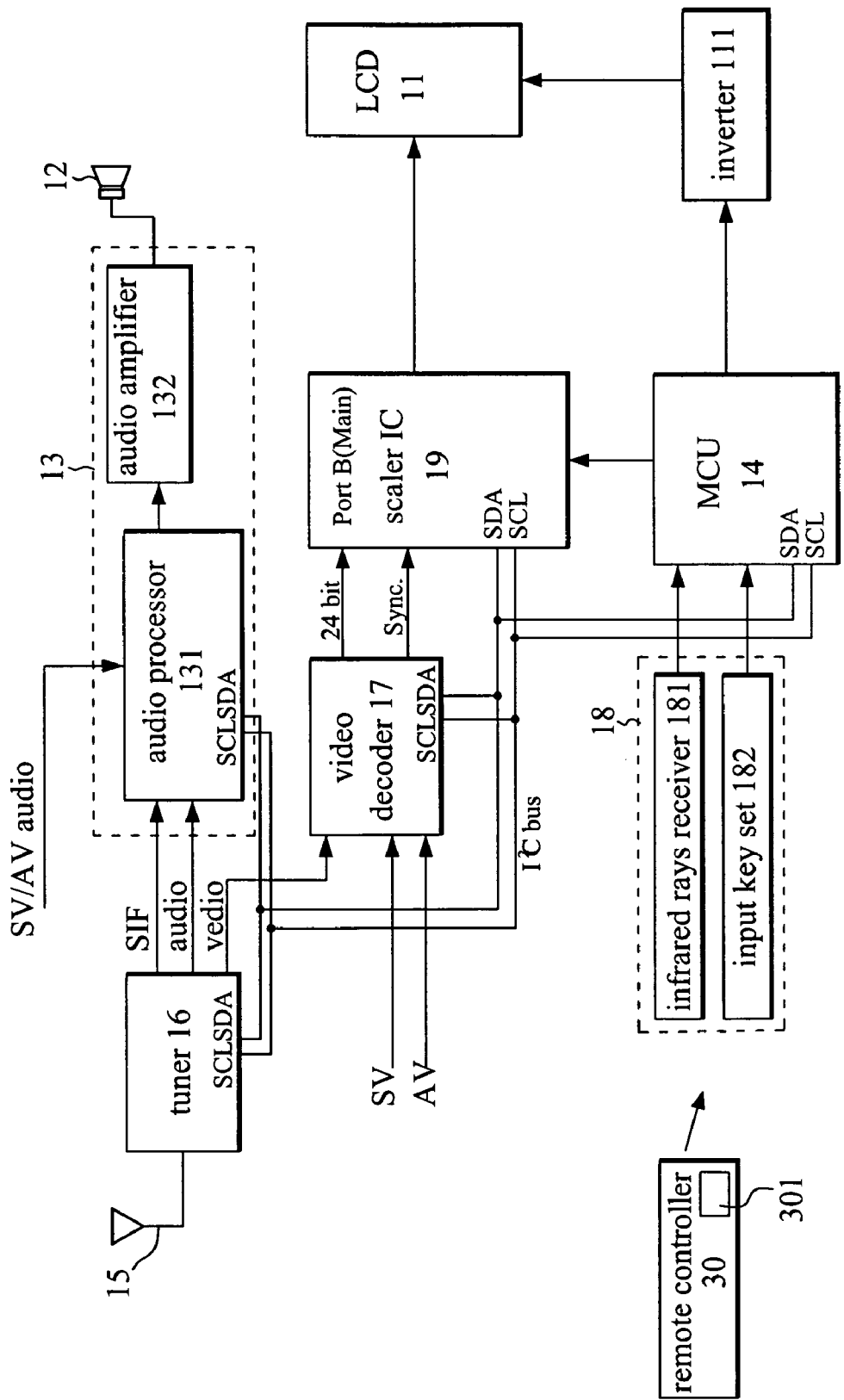
FIG. 1 is a functional block diagram of the preferred embodiment of the present invention.
Figure 2:
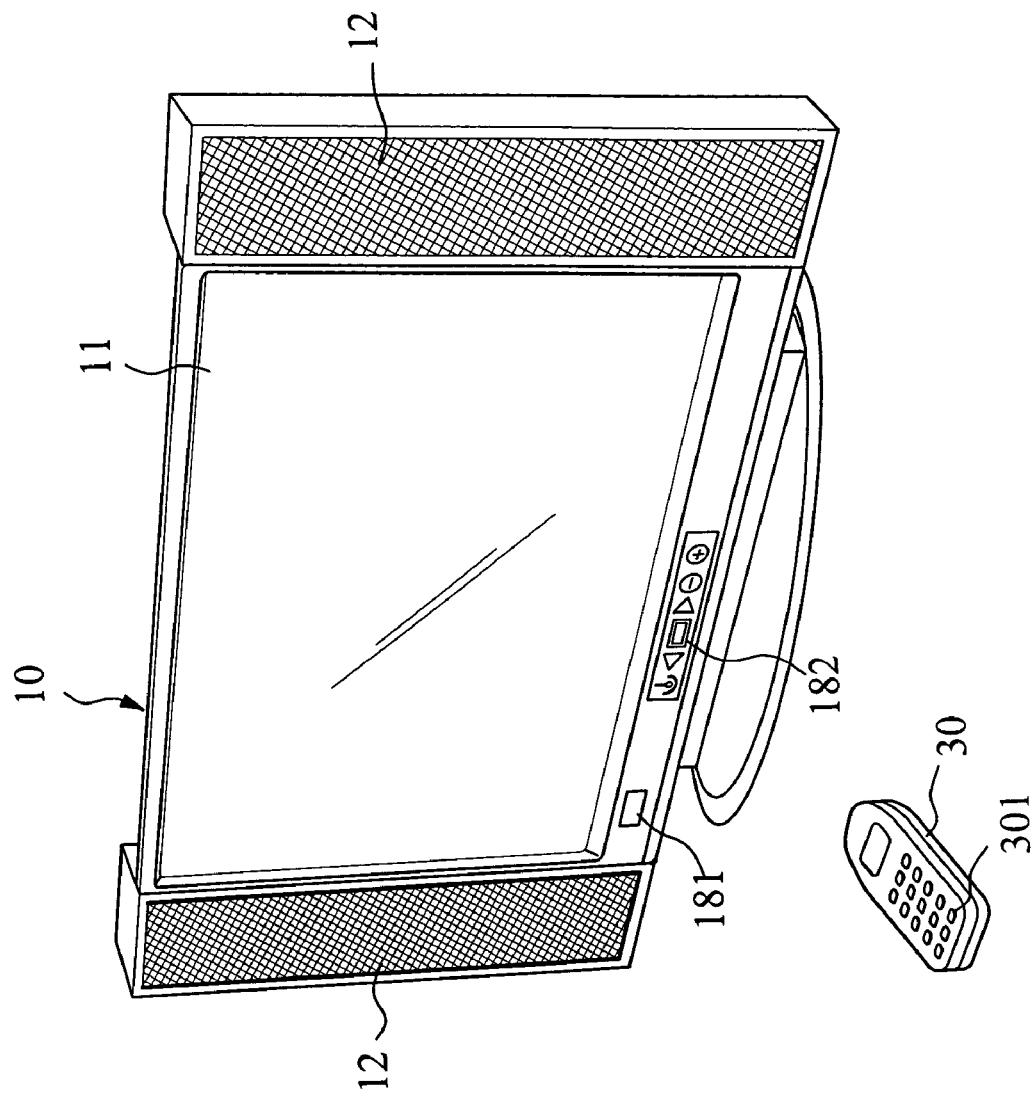
FIG. 2 is a exterior view of the preferred embodiment of the present invention.

Referring to FIG. 1 and FIG. 2, the television with the frequency modulation receiver 10 of the present invention comprises a Liquid Crystal Display 11, a speaker 12 and a Micro Control Unit (MCU) 14; moreover, the television with the frequency modulation receiver 10 further comprises a tuner 16 for both television and frequency modulation (FM). The above tuner 16 comprises an antenna (not shown) electrically connects to an external FM antenna 15 and can adjust and receive frequency ranging from 88 MHz to 108 MHz. The television with the frequency modulation receiver 10 further comprises a control device 18. The control device 18 electrically connects to the MCU 14 and transmits protocol to the tuner 16 through a I²C Bus (such as SDA and SCL), then the tuner 16 adjusts its frequency to a desired channel according to the content of the protocol, and then outputs audio signals to the audio processor 131, the audio processor 131 includes a FM demodulator (not shown), the FM demodulator electrically connects to the audio amplifier 132 and demodulates the audio signals and outputs to the audio amplifier 132 for broadcasting those audio signals through the speaker 12.

Figure 3:
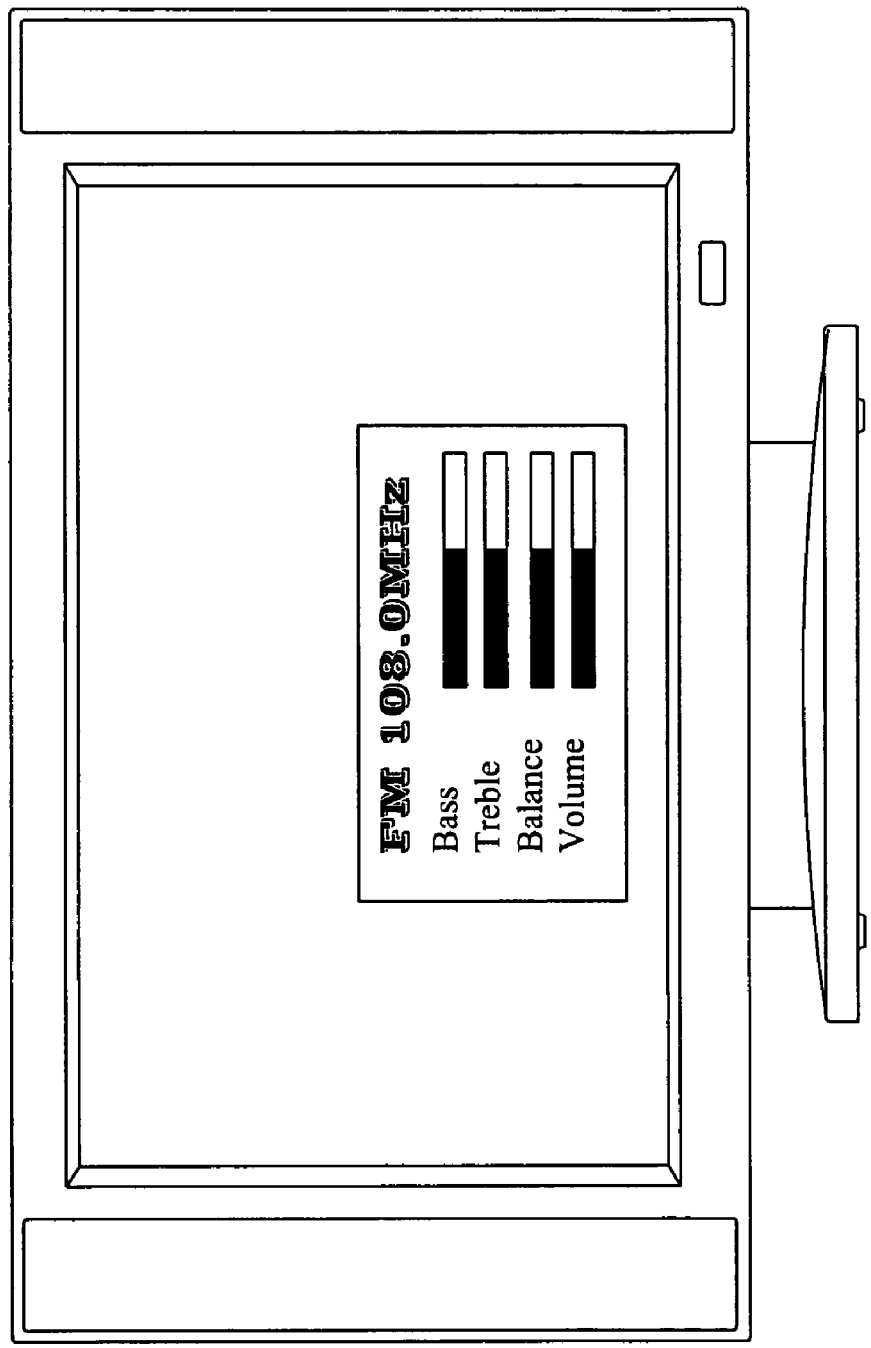
FIG. 3 is a schematic drawing of the Liquid Crystal Display of the preferred embodiment of the present invention.

Moreover, the present invention further comprises a scaler IC 19. When the users utilize the television with the frequency modulation receiver 10 to process the FM broadcasting, they can input another controlling signal S3 via the control device 18 to the MCU 14 which controls the scaler IC 19 to display the broadcast information on the Liquid Crystal Display 11. The broadcast information includes the frequency information of specific frequency signal that is adjusted by the tuner 16, the left and right sound, volume and stereo, as shown on FIG. 3.

In this preferred embodiment of the present invention, the control device 18 further comprises an input key set 182 to input a specific signal to the MCU 14. If the users would like to listen to a specific radio program, they can use the channel increasing/decreasing key on the input key set 182 to send a controlling signal S2 to the MCU 14, and then the protocol inputted can be carried to the tuner 16 through I²C Bus (SDA, SCL). The control device 18 also includes an infrared rays receiver 181 to receive the controlling signals from the remote controller 30. Moreover, the key set 301 on the remote controller 30 that sends the controlling signals by infrared rays can also achieve the function of the input key set 182.

When the controlling signals are inputted, the MCU 14 will send the signals to the scaler IC 19 and then display it on the Liquid Crystal Display 11. After ten seconds, if the users no longer use the key set 301 on the remote controller 30 or the input key set 182 on the television, the MCU 14 will output a specific signal to the scaler IC 19 and control the inverter 111 to turn off the television, i.e., to turn off the cathode rays, to save the electricity. Thereafter, whether the users press the key set 301 or the input key set 182, the inverter 111 will turn on the television in about one second.

As a result, the present invention can unify the television and the FM radio. Except for saving the cost of hardware and lowering the power consumption, the present invention can also improve greatly the convenience in use, for the users may not have to wait for a long time to see the broadcast information on the screen as traditional television did.

Although the present invention has been explained in relation to its preferred embodiment, it is to be understood that many other possible modifications and variations can be made without departing from the spirit and scope of the invention as hereinafter claimed.

What is claimed is:

1. A television with the frequency modulation receiver comprises a Liquid Crystal Display (LCD), a scaler Integrated Circuit (IC), an audio processor, an audio amplifier, a video decoder, a speaker, and a Micro Control Unit (MCU), wherein, said MCU electrically connects to said scaler IC, said video decoder and said audio processor through an I²C Bus respectively;

wherein, said television further comprising:
a tuner applied for both television and frequency modulation (FM), said tuner comprising an antenna terminal electrically connects to an external antenna; and
a control device, electrically connecting to said MCU and transmitting protocol to said tuner through said I²C Bus, said tuner adjusts its frequency to a desired channel according to the content of the protocol, and then outputs an audio signal to said audio processor, said audio processor includes a FM demodulator, said FM demodulator electrically connects to said audio amplifier and demodulates the audio signal and outputs to said audio amplifier for broadcasting through said speaker.

2. The television with the frequency modulation receiver as claimed in claim 1, wherein said tuner adjusts the frequency ranging from 88 MHz to 108 MHz.

3. The television with the frequency modulation receiver as claimed in claim 1, wherein said control device comprises an infrared rays receiver receiving an infrared rays controlling signal from a remote controller and correspondingly producing said controlling signal.

4. The television with the frequency modulation receiver as claimed in claim 1, wherein said control device comprises an input key set to input a specific signal to adjust the frequency of said tuner.

* * * * *